N. A. COBB.
MICROSCOPE COVER GLASS CENTERING DEVICE.
APPLICATION FILED MAR. 5, 1912.

1,139,165.

Patented May 11, 1915.

Witnesses
Alice W. Cobb
W. E. Chambers

Inventor
Nathan A. Cobb

UNITED STATES PATENT OFFICE.

NATHAN A. COBB, OF FALLS CHURCH, VIRGINIA.

MICROSCOPE-COVER-GLASS-CENTERING DEVICE.

1,139,165. Specification of Letters Patent. Patented May 11, 1915.

Application filed March 5, 1912. Serial No. 681,749.

*To all whom it may concern:*

Be it known that I, NATHAN AUGUSTUS COBB, a citizen of the United States, residing at Falls Church, in the county of Fairfax and State of Virginia, have invented certain new and useful Improvements in Microscope-Cover-Glass-Centering Devices, of which the following is a specification.

My invention relates to a device for centering microscope cover glasses, whether these cover-glasses are round or square.

In my invention the centering of the cover-glass is accomplished by means of three bearings, combined in such a way that when the slide is brought to a specific position by laying it on a support, of the same width as the slide, against one of the bearings, the other two bearings may be used to center the cover-glass, it being only necessary to float the cover-glass against these two latter bearings until the mounting fluid or cement has filled the space between the slide and the cover-glass. The cover-glass will thus be centered in case it is round.

If it is square it will be centered in one direction, and will be in such a position that little attention will be necessary to center it in the other direction.

I may make the bearing first mentioned stationary or adjustable. When stationary the device will center cover-glasses of only one size. When this bearing is adjustable the device will center cover-glasses of various sizes. The former form is cheaper to construct, but the latter is the more convenient and useful.

I attain these objects by means illustrated in the accompanying drawings.

Figure 1:
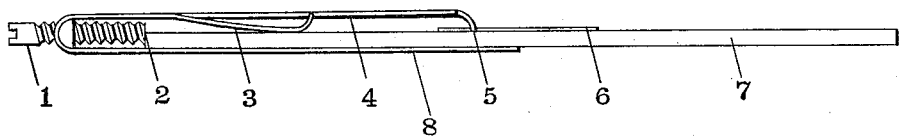
Figure 2:
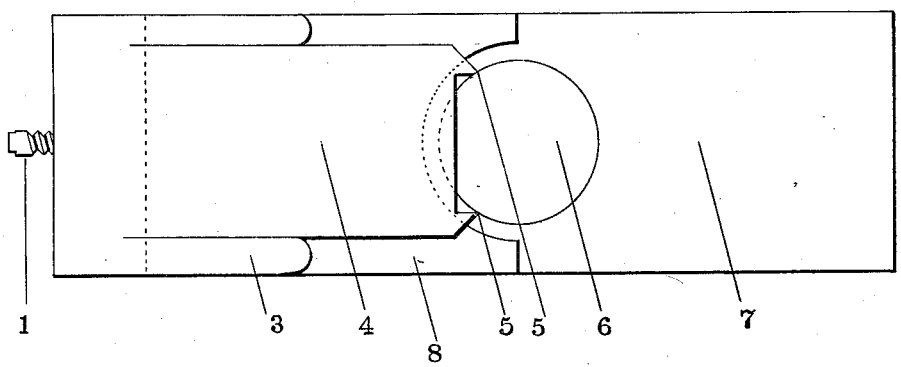
Figure 3:
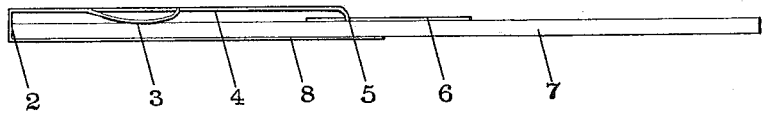

Figure 1 is a side elevation of my centering device about twice natural size. Fig. 2 is a plan of the same device shown the same size. Fig. 3 is a side elevation of a simple form.

Similar numbers refer to similar parts in the three views.

1, indicates the screw whose tip is the adjustable bearing against which the end of the microscope slide is pressed to bring it into the proper position. In addition to being pressed against the end of this screw the slide is laid so as to fit the support 8, which has the same width as the slide to facilitate the accurate adjustment of the slide.

2, indicates the point at which the slide 7 bears on the tip of the screw.

3, indicates one of the two similar springs that help to hold the slide in position.

4, indicates the spring which is forked at its free end to form two bearings against which the cover glass floats or slides.

5, 5, are the two bearings that serve to center the cover-glass when it rests against them.

6, indicates the cover-glass.

7, indicates the microscope slide.

8 indicates the support for the slide namely the lower plate to the left hand end of which the spring is attached.

Fig. 1 shows at double size a slide 7 with a cover-glass 6 centered on it. The spring 4 is raised to admit the slide, and this latter is pushed back so that it bears against the tip of the screw 1, this latter having been previously so adjusted as to center this particular size of cover-glass. In order to fit the slide accurately to the support, the support and the slide are held between the thumb and forefinger at a point about midway of the support. When the slide has been so adjusted, the cover-glass is slid or floated in between the two prongs of the free end of the spring, *i. e.* the prongs 5, 5. To do this the slide should be tilted a little downward at the left-hand end. During this latter operation the slide is held in position by the aid of the springs 3, which, though not absolutely necessary, are of great value.

Fig. 2 shows the slide shown in Fig. 1 when looked at from above. The left-hand end of the slide is indicated by the straight dotted line. This view shows the pronged end of the support, which facilitates the heating of the object during the process of securing the cover-glass in position. This figure also shows the pronged end of the spring 4, with the edge of the cover-glass, 6, resting against them.

Fig. 3 shows a simple form of my cover-glass centering device, made of a single piece of material and with a fixed bearing, 2, for the end of the microscope slide. This form will center only a single size of cover-glass. It is not adjustable in the proper sense of the term, though it can be adjusted to a limited extent by bending the pointed bearings 5.

I claim,

1. The combination in a cover-glass centering device of a support having the same width as the slide; and a spring to hold the slide against the support; the spring having two projections bearing on the top of the slide at two points such that when the edge of the cover-glass rests against these two bearing points it is centered on the slide.

2. The combination in a cover-glass centering device of a support which is two-pronged at its free end and of the same width as the slide; a spring to hold the slide against the support; the spring having a bearing for the end of the slide, this bearing being located near that end of the support to which the spring is attached; and a pair of projections on the spring, bearing on the top of the slide at two points such that when the slide rests against the first bearing and is fitted to the support, i. e. lies with its two edges adjacent to and parallel to the edges of the support, the bearing points of the pair of projections may be used to center the cover-glass.

3. The combination in a cover-glass centering device of a support for the slide, a spring to hold the slide against the support and having two projections bearing on the top of the slide at two points such that when the cover-glass rests against the two latter it is equidistant from the edges of the slide; and an adjustable bearing for the end of the slide located near the end of the support to which the spring is attached, and such that cover-glasses of different sizes may be centered.

4. The combination in a cover-glass centering the device of a bearing for the end of the microscope slide, and two bearings on the top of the slide such that when the edge of a cover-glass is rested against these two latter bearings it is centered on the slide.

5. The combination in a cover-glass centering device of a support having two prongs at its free end, and of the same width as the slide; a spring to hold the slide against the support; an adjustable bearing for the end of the slide and located near the end of the support to which the spring is attached; two projections on the spring, bearing on the top of the slide at two points such that when the edge of the cover-glass is rested against these two bearing points it is centered on the slide; and an additional spring to assist in holding the slide against the support in a proper position.

In testimony whereof I affix my signature in presence of two witnesses.

NATHAN A. COBB.

Witnesses:
ALICE V. COBB,
W. H. LAMBERT.

Copies of this patent may be obtained for five cents each, by addressing the "Commissioner of Patents, Washington, D. C."